(12) United States Patent
Signer et al.

(10) Patent No.: US 6,247,886 B1
(45) Date of Patent: Jun. 19, 2001

(54) UNLOADER TUBE UPPER PIVOT SUPPORT MECHANISM

(75) Inventors: Todd Neil Signer, East Moline; Darryl Francis Cain, Moline, both of IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/566,607

(22) Filed: May 9, 2000

(51) Int. Cl.⁷ ...................................................... B60P 1/42
(52) U.S. Cl. .............................................................. 414/523
(58) Field of Search ............................................. 414/523

(56) References Cited

U.S. PATENT DOCUMENTS

| | | | |
|---|---|---|---|
| 4,093,087 | * 6/1978 | DeCoene | 414/523 |
| 4,742,938 | * 5/1988 | Niewold | 414/523 X |
| 4,866,920 | 9/1989 | Kerckhove et al. | 56/16.6 |
| 5,329,015 | 7/1994 | Volk, Jr. et al. | 198/548 |
| 5,443,352 | 8/1995 | Schuhmacher | 414/526 |

OTHER PUBLICATIONS

Deere & Company, CTS Combine Parts Manual, 6 pages, publication date—Oct. 24, 1994, published in U.S.A.
Deere & Company, 9650 STS and 9750 STS Self–Propelled Combines Parts Manual, 2 pages, publication date—Aug. 2, 1999, published in U.S.A.
Parts Catalog published by a company known as Claas in 1996 in Germany, 2 pages.
Parts Catalog published by a company known as Case in 1997 in the U.S.A., 4 pages.

* cited by examiner

*Primary Examiner*—Steven A. Bratlie

(57) ABSTRACT

An upper support mechanism for an unloader auger tube of a combine having a ball mechanism fixed atop the unloader auger tube and a bushing having a generally spherical opening for swivellably receiving the ball member. The bushing is slidable up and down within a cylindrical opening formed in a sleeve member fixed with the combine frame. The bushing is made of a material that generally does not require lubrication as it rubs against the ball member or the sleeve member.

10 Claims, 4 Drawing Sheets

UNLOADER TUBE UPPER PIVOT SUPPORT MECHANISM

BACKGROUND OF THE INVENTION

It is known to provide agricultural vehicles such as combines with a container for temporarily storing grain that the combine has harvested and threshed. Operatively connected with these containers are unloading tubes through which the grain from the container passes during grain unloading operations. An auger is typically positioned within the unloading tube for directing grain from the container into and through the unloading tube. As grain is unloaded from the combine's grain container through the unloading tube in this manner the grain is expelled into a truck or grain cart traveling next to the combine.

Many conventional unloading tubes include a generally upright lower portion operatively connected with and extending upwardly from a lower portion of the combine grain container. An upper portion of the unloader tube extends generally horizontally and is operatively coupled with the upper end portion of the upright portion. Augers are typically positioned within the lower and upper portions of the unloader tube. A gearbox is provided at the junction of the upper and lower portions of the unloader tube for operatively connecting the auger sections in the two portions of the unloader tube.

Conventional unloader tubes are adapted to pivot between two positions about the central axis of the lower portion of the tube. In a first position the upper portion of the unloader tube is positioned generally longitudinally with respect to the vehicle and is located in close proximity along the side of the vehicle, as shown in FIG. 1. The unloader tube can be swung outwardly from this position about the central axis of the lower portion to a position whereat the upper portion of the tube extends generally laterally outwardly from the side of the combine. The outer end of the unloader tube is positioned relatively high in the air such that a grain truck or cart can be positioned under the end of the tube to receive the grain being propelled from the tube.

The unloader tubes tend to be relatively heavy structures, since they house the augers and bear a large amount of weight when they carry heavy amounts of grain during operation. The unloader tubes must therefore be braced to withstand these forces during operation. The lower portion of the unloader tubes are held firmly in position by a sturdy support ring structure that supports the lower portion of the tube and allows the unloader to tube to pivot. Conventional combines also typically include an upper support structure above the tube's lower portion. The upper support mechanism helps keep the lower portion of the tube generally upright and helps keep the lower portion from toppling over due to the weight of the tube, augers and grain within the tube.

One type of conventional upper support mechanism includes a pin member closely aligned with the axis of the lower portion of the unloader tube. The pin is received within a tubular structure fixed with the side of the combine. The lower portion of the tube is manufactured and assembled to relatively exact tolerances so that the pin member is relatively precisely located in alignment with the axis of the lower portion of the tube. Also, the tubular structure and the brackets which hold it in place are manufactured and assembled to relatively exact tolerances so that the axis of the tubular structure is held in position in relatively precise alignment with the axis of the pin member. The processes of manufacturing and assembling all these parts to exact tolerances are relatively costly and time consuming, and raises the complexity and cost of the combine.

Another type of conventional upper support mechanism includes a metal pin member generally aligned with the axis of the lower portion of the unloader tube. The lower portion of the tube is not manufactured or assembled to exact tolerances, so the pin may be slightly misaligned from the axis of the lower portion of the unloader tube. This misalignment can cause the pin to shift in various directions as the unloader tube swings between its two positions. The pin is slidably received within a metal bearing member held within a metal housing. The bearing is free to swivel within the metal housing, and the pin is free to slide up and down within the bearing member. Therefore misalignment of the pin and housing member from the exact axis of the lower portion of the unloader tube is compensated for by the freedom of motion of the pin with respect to the housing member. This type of upper support mechanism is relatively inexpensive to manufacture and assemble since it is not manufactured to exact tolerances. However, the metal bearing member swivels in contact with the metal housing member, and the pin slides in contact with the bearing, and therefore the support requires lubrication so as to avoid excessive wear. This type of upper support mechanism therefore requires regular maintenance so that lubrication can be applied to the bearing surfaces within the structure.

It would therefore be desirable to provide an upper support mechanism which helps retain a combine unloader tube in its proper upright position during operation such as when filled with grain, and which does not require lubrication at regular intervals. It would also be desirable for such a mechanism to not require manufacturing or assembly processes having exact tolerences. It would be desirable for such a mechanism to allow for motion that might occur due to slight misalignments of the upper support structure from the actual axis of the lower portion of the unloader tube. It would be desirable to reduce the cost and complexity of the assembly process and the mechanism itself.

SUMMARY OF THE INVENTION

The preferred embodiment of the present invention is an upper support for a combine auger unloader tube, and includes a ball mechanism fixed atop the unloader tube. The ball member is swivellably received within a generally spherical socket formed by a bushing member made of an ultra high molecular weight polyethylene material. The bushing is slidably received within a generally cylindrical opening formed in a sleeve that is fixed to the side of the combine. The bushing is allowed to slide up and down within the cylindrical opening in the sleeve. The swivelling motion allowed by the ball and socket arrangement and the up and down motion allowed by the bushing within the cylindrical opening of the sleeve accommodate motion of the unloader tube associated with the upper support mechanism being slightly offcenter with respect to the pivot axis of the unloader tube. Therefore, the unloader tube and upper support mechanism can be manufactured with less than exact tolerances, which reduces the complexity of the mechanism and the cost of manufacturing.

The bushing is comprised of a material such as ultra high molecular weight polyethylene that can rub in contact with a smooth metal surface generally without requiring lubrication to prevent wearing. The bushing according to the present invention generally does not require lubrication between the contact surfaces of the ball mechanism and the spherical opening in the bushing, or between the contact surfaces of the bushing and the cylindrical opening in the sleeve. Therefore, routine maintenance procedures of regularly lubricating an upper support mechanism are generally eliminated.

The bushing is formed of two halves that fit snuggly together around the ball mechanism during the assembly process. The design of the two halves allows the parts to be formed with manufacturing processes that are relatively simple and cost effective. When snapped together the two halves form the spherical opening in the center of the bushing which swivellably receives the ball mechanism during operation. Pegs and mating openings formed in the two halves retain the two parts together when snapped onto the ball mechanism. The surface of the cylindrical opening in the sleeve also serves to confine the two parts of the bushing and in abutment with each other during operation.

DESCRIPTION OF THE PREFERRED EMBODIMENT

Figure 1:
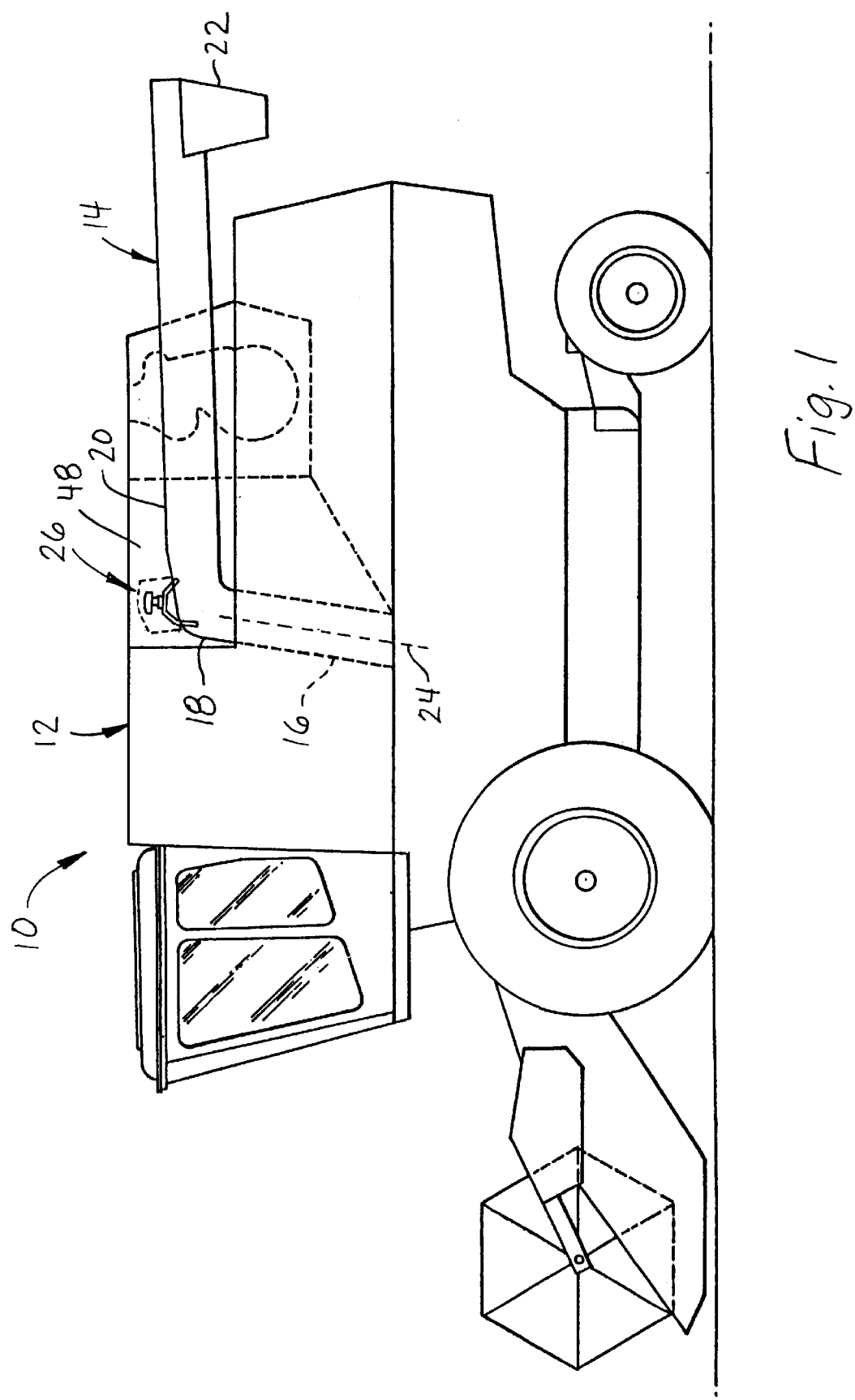
FIG. 1 is a schematic side view of a combine such as is used for harvesting and threshing of grain crops.
Figure 2:
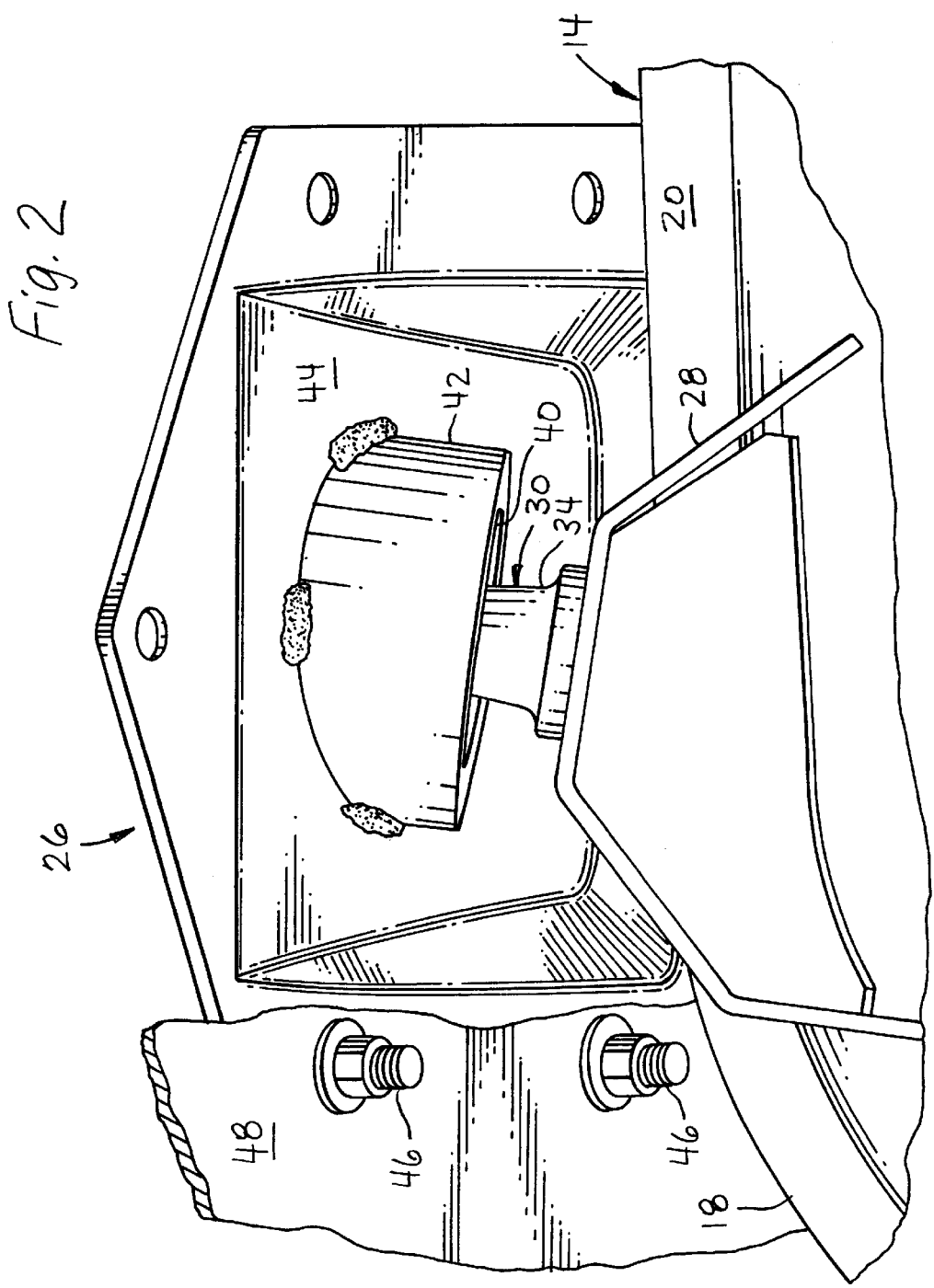
FIG. 2 is a side view of an upper pivot support mechanism according to the present invention which supports the unloader tube.
Figure 3:
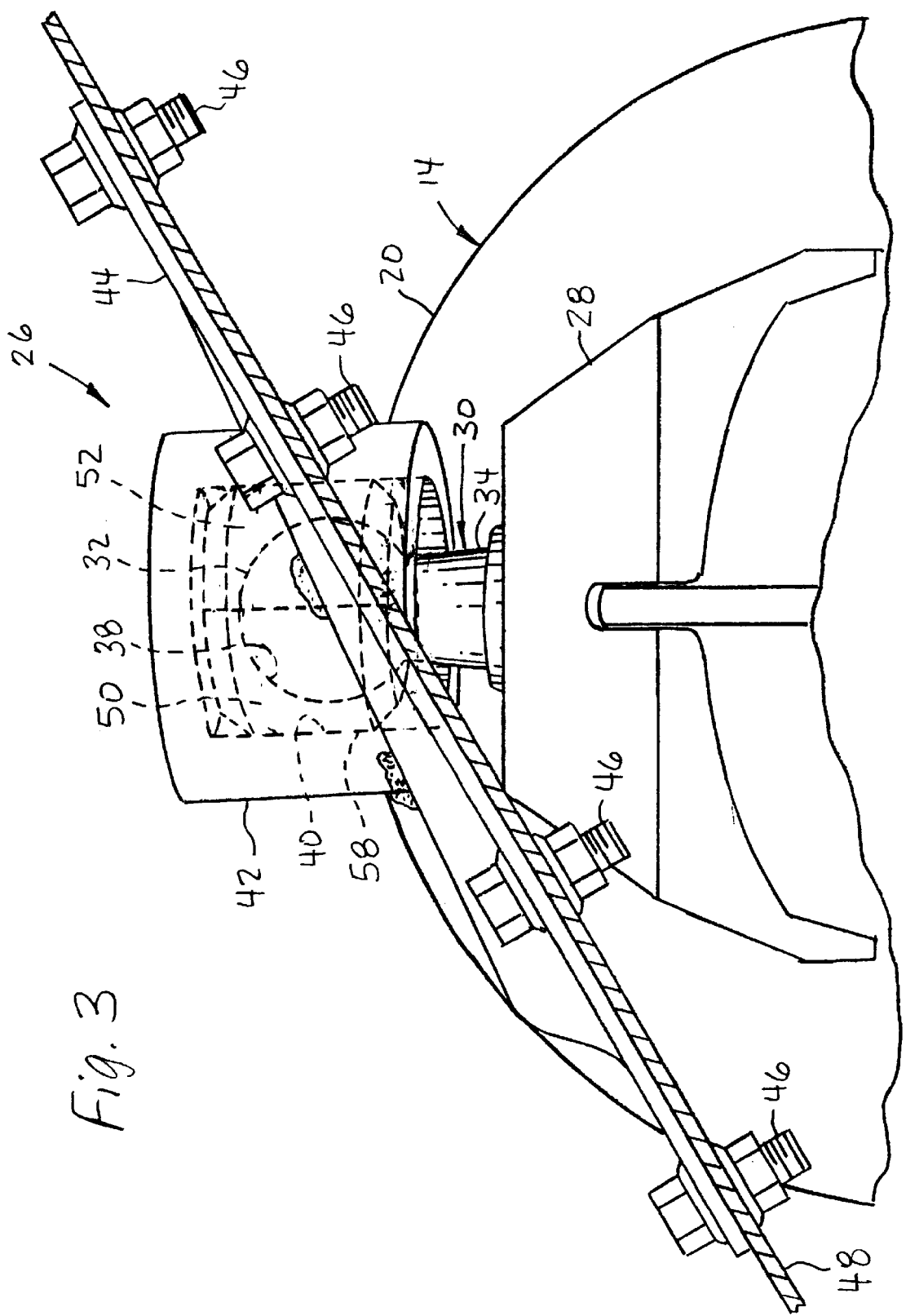
FIG. 3 is a front view of the upper pivot support mechanism shown in FIG. 2.
Figure 4:
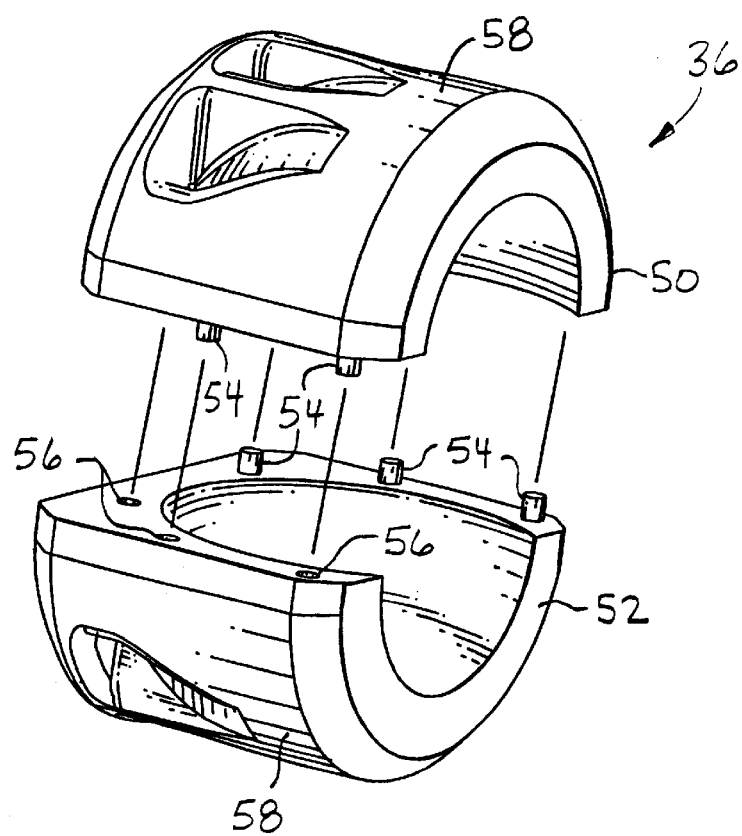
FIG. 4 shows the two halves of the bushing according to the present invention.
Figure 5:
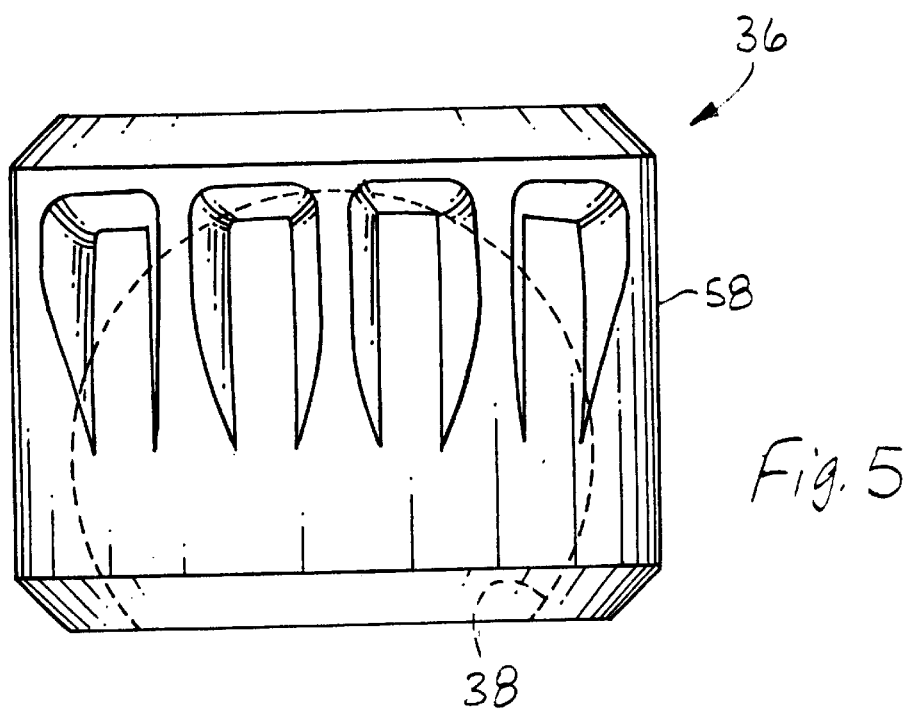
FIG. 5 is an assembled view of the two halves of the bushing shown in FIG. 4.

Referring now to FIG. 1, there is shown a side view of a combine 10 capable of harvesting and threshing grain crops. The combine 10 includes a grain container 12 into which the threshed grain is directed. An unloader tube 14 is provided through which grain from the container 12 passes for emptying the contents of the container 12 into a grain truck or grain cart alongside the combine 10. The unloader tube 14 includes a generally upright lower portion 16 that is operatively connected with a bottom portion of the combine's grain tank 12. Grain from within the grain tank 12 is directed into the lower portion 16 of the unloader tube 14 and is directed upwardly therein by an auger positioned within the lower portion of the tube 14 . The tube 14 makes a bend 18 at the upper end of the lower portion 16. An upper portion 20 of the tube 14 is connected to the bend portion 18 and extends generally horizontally when positioned in close proximity alongside the combine 10. A gearbox within the bend portion 18 transmits rotational energy from the auger within the lower portion 16 to an auger within the upper portion 20 of the tube 14.

The unloader auger tube 14 is pivotal from the position shown in FIG. 1 whereat the upper portion 20 is positioned in close proximity alongside the combine 10 to a position whereat the upper portion 20 extends laterally outwardly from the combine 10. As the unloader tube 14 is swung outwardly the end 22 of the tube 14 swings upwardly slightly, since the axis 24 of the lower portion 16 about which the tube 14 swings is at a slight angle to true vertical. This allows the end 22 of the tube 14 to be positioned above large grain trucks or grain carts during the unloading process.

The unloader tube 14 is relatively heavy due to the weight of the tube 14, the augers and the grain within the tube 14. To resist the forces associated with this large amount of weight, the tube 14 is provided with upper and lower support mechanisms. At the lower end of the lower portion 16 of the tube 14 is a lower or ring support mechanism (not shown) that supports a large portion of the weight of the tube 14 during operation, and allows the lower tube 16 to pivot about its axis. An upper support 26 according to the present invention is also provided generally directly above the lower portion 16 of the tube 14. The upper support 26 helps retain the lower portion 16 of the tube 14 in its position as the tube 14 is swung about, and prevents the weight of the tube 14 from toppling the tube 14 over.

The upper support 26 includes a bracket 28 fixed as by welds to the unloader tube 14. Welded to the top surface of the bracket 28 is a ball mechanism 30 that includes a generally spherical portion 32 fixed with an upright shaft portion 34. The spherical portion 32 is received within a bushing member 36 made of an ultra high molecular weight polyethelene material. The bushing member 36 is formed by two halves which fit together to define a generally spherical central opening 38 within which the ball 30 is positioned during operation. The bushing 36 is positioned within a generally cylindrical opening 40 in a metal sleeve member or gudgeon 42. The bushing 36 fits snuggly within the opening 40 in the sleeve 42 but is provided enough clearance to allow the bushing 36 to slide up and down within the sleeve 42. The sleeve 42 is fixed as by welds to a plate 44 that is fixed via bolts 46 to an angled wall 48 on the side of the combine 10.

The ball mechanism 30 can swivel within the opening 38 in the bushing 36, and the bushing 36 can shift up and down within the cylindrical opening 40 in the sleeve 42. This allows the upper support mechanism 26 according to the present invention to accommodate motion associated with inexact positioning of the upper support mechanism 26 with respect to the axis 24 of the lower portion 16 of the tube 14. Therefore, the tube mechanism 14 and upper support mechanism 26 can be manufactured generally without exact tolerances, and therefore the complexity and cost of the structure is correspondingly reduced.

The bushing 36 is made of an ultra high molecular weight material that can rub in contact with the inner surface of the cylindrical opening 40 in the sleeve 42 without requiring lubrication. The bushing 36 and sleeve 42 will therefore tend not to wear, gall or overheat in the absence of lubrication, thereby eliminating the need to regularly grease the mechanism. Similarly, the material of the bushing 36 allows the ball member 30 to rub in contact with the spherical opening 38 defined within the bushing 36 without requiring the surfaces to be lubricated. This eliminates the need to regularly grease these contact surfaces. Other materials that would not require lubrication could also be used, such as certain plastics, nylon, brass or bronze.

The bushing 36 is formed of two halves 50, 52 that are snapped together around the ball member 32 during assembly. Sets of pegs 54 and mating openings 56 fit together to generally retain the two halves 50, 52 of the bushing 36 together. The inner diameter of the cylindrical opening 40 in the sleeve 42 generally abuts the outer generally cylindrical surface 58 of the assembled bushing 36, which serves to confine the two pieces 50, 52 of the bushing 36 in abutment with each other during operation, thereby further securing the pieces 50, 52 together. This design is relatively simple in construction and functions effectively to provide a bearing surface for the spherical ball member 32 and yet is easily manufactured and assembled.

The ball mechanism 30 can be provided using a conventional ball hitch commonly fixed to vehicles for towing trailers. Many conventional ball hitches include a chrome finish and a threaded lower portion. However, the ball mechanism 30 according to the present invention does not have a chrome finish, and includes a lower portion without threads.

What is claimed is:

1. A pivot mechanism, comprising:

a vehicle having a grain container, an unloader tube through which grain from the container passes to unload the container, the unloader tube having a generally upright lower portion operatively connected with the grain container, and an upper portion of the unloader tube is operatively connected with a top portion of the lower portion of the unloader tube, the unloader tube being pivotable about an axis of the lower portion between first and second positions such that in the first position the upper portion extends generally longitudinally and is positioned proximate the vehicle, and in the second position the upper portion extends laterally outwardly from the vehicle, a generally spherical ball member fixed with the unloader tube and positioned above the lower portion and in general alignment with the axis of the lower portion, a bushing member having a generally spherically shaped opening which receives the ball member and allows the ball member to swivel therein about the center of the spherically shaped opening, said bushing member is received within a sleeve member fixed with the vehicle and is slidable up and down within the sleeve member.

2. The pivot mechanism of claim 1, wherein the bushing is a material that generally resists wear caused by friction in the absence of lubrication.

3. The pivot mechanism of claim 2, wherein the bushing is an ultra high molecular weight material.

4. The pivot mechanism of claim 3, and further comprising an auger positioned within the unloader tube for propelling grain through the unloader tube.

5. The pivot mechanism of claim 4, wherein the vehicle is a combine.

6. The pivot mechanism of claim 2, wherein the bushing is formed of a plurality of parts that fit together to form the spherical opening around the ball member during assembly of the mechanism and are generally held together by the sleeve member.

7. The pivot mechanism of claim 6, and further comprising peg members and openings formed in the plurality of parts which fit together to hold said plurality of parts together around the ball mechanism before the bushing is inserted into the sleeve member.

8. A pivot mechanism, comprising:

a vehicle having a grain container, an unloader tube through which grain from the container passes to unload the container, the unloader tube having a generally upright lower portion operatively connected with the grain container, and an upper portion of the unloader tube is operatively connected with a top portion of the lower portion of the unloader tube, the unloader tube being pivotable about an axis of the lower portion between first and second positions such that in the first position the upper portion extends generally longitudinally and is positioned proximate the vehicle, and in the second position the upper portion extends laterally outwardly from the vehicle, a generally spherical ball member fixed with the unloader tube and positioned above the lower portion and in general alignment with the axis of the lower portion, a bushing member having a generally spherically shaped opening which receives the ball member and allows the ball member to swivel therein about the center of the spherically shaped opening, said bushing member is received within a sleeve member fixed with the vehicle and is slidable up and down within the sleeve member, and said bushing is a material that generally resists wear caused by friction in the absence of lubrication, and said bushing is formed of a plurality of parts that fit together to form the spherical opening around the ball member during assembly of the mechanism and which are generally held together during operation by the sleeve member, and an auger positioned within the unloader tube for propelling grain through the unloader tube.

9. The pivot mechanism of claim 8, wherein the bushing is an ultra high molecular weight material.

10. The pivot mechanism of claim 8, and further comprising peg members and openings formed in the plurality of parts which fit together to hold said plurality of parts together around the ball mechanism before the bushing is inserted into the sleeve member.

* * * * *